(12) United States Patent
Hüppchen et al.

(10) Patent No.: US 9,579,595 B2
(45) Date of Patent: Feb. 28, 2017

(54) TRANSMISSION OIL FILTER COMPRISING A MELT BLOWN LAYER AT THE DOWNSTREAM SIDE

(75) Inventors: Claudia Hüppchen, Stuttgart (DE); Harald Banzhaf, Stuttgart (DE); Gunnar-Marcel Klein, Velbert-Langenberg (DE); Thorsten Schmid, Stuttgart (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 871 days.

(21) Appl. No.: 12/211,444

(22) Filed: Sep. 16, 2008

(65) Prior Publication Data

US 2009/0120868 A1    May 14, 2009

(30) Foreign Application Priority Data

Sep. 19, 2007  (DE) .................... 20 2007 013 215 U

(51) Int. Cl.
| | | |
|---|---|---|
| *B01D 27/14* | (2006.01) | |
| *B01D 39/20* | (2006.01) | |
| *B01D 39/16* | (2006.01) | |
| *B01D 29/03* | (2006.01) | |

(52) U.S. Cl.
CPC ..... *B01D 39/2003* (2013.01); *B01D 39/1623* (2013.01); *B01D 27/14* (2013.01); *B01D 29/03* (2013.01); *B01D 2239/0668* (2013.01)

(58) Field of Classification Search
CPC ............ B01D 39/1623; B01D 39/2003; B01D 2239/0668; B01D 27/14; B01D 27/144; B01D 27/146; B01D 29/0052; B01D 29/0054; B01D 29/0059; B01D 71/04; B01D 29/0027; B01D 39/2017; B01D 29/03

USPC .. 210/490, 491, 500.26, 496, 505, 508, 509, 210/493.5

See application file for complete search history.

(56) References Cited

U.S. PATENT DOCUMENTS

| | | | |
|---|---|---|---|
| 4,676,807 A | 6/1987 | Miller | |
| 4,759,782 A | 7/1988 | Miller | |
| 6,161,540 A | 12/2000 | Fecteau | |
| 6,454,827 B2* | 9/2002 | Takagaki et al. ............... | 55/492 |
| 6,596,109 B2 | 7/2003 | Posa et al. | |
| 2003/0082979 A1 | 5/2003 | Bean | |
| 2005/0132682 A1 | 6/2005 | Paul | |

FOREIGN PATENT DOCUMENTS

| | | |
|---|---|---|
| DE | 19933163 | 2/2001 |
| DE | 10013315 | 9/2001 |
| DE | 10235275 | 2/2004 |
| EP | 0208515 B1 | 1/1987 |
| EP | 1035902 | 9/2000 |
| WO | WO99/55422 A | 11/1999 |

OTHER PUBLICATIONS

EP Search Report EP 08 16 4672.

* cited by examiner

*Primary Examiner* — Madeline Gonzalez
(74) *Attorney, Agent, or Firm* — James Hasselbeck

(57) ABSTRACT

A transmission oil filter has a filtration layer of fiberglass medium and, downstream of the filtration layer, a melt blown layer applied to the filtration layer for preventing or reducing introduction of fiberglass into the liquid to be filtered. The filtration layer of fiber glass medium has two faces and a spunbond layer is attached for improved handling of the filtration layer of fiberglass medium to at least one of the two faces.

17 Claims, 1 Drawing Sheet

TRANSMISSION OIL FILTER COMPRISING A MELT BLOWN LAYER AT THE DOWNSTREAM SIDE

BACKGROUND OF THE INVENTION

The invention relates to a filter for filtering liquids, in particular a transmission oil filter. However, the invention is useable also in connection with filtration of lubricant oil, hydraulic oil, or compressor oil.

Transmission oil filters are known that have a fiberglass layer that is covered on both faces with a spunbond nonwoven. The spunbond nonwoven improves handling of the fiberglass layer, for example, in the manufacturing process of the filter.

Multi-layer filters for the filtration of liquids are known as, for example, disclosed in European patent 1 035 902. A melt blown nonwoven is disclosed that is provided at the downstream side with a layer of cellulose-containing filter paper.

In connection with air filtration, DE 100 133 15 discloses that fiberglass media release fiberglass pieces into the area of the purified medium. Therefore, this reference recommends that fiberglass media should be replaced with other types of filter materials. Such a release of fiberglass pieces can also be observed in connection with liquid filtration where fiberglass media are used that are covered or lined with spunbond nonwoven.

It is an object of the present invention to prevent or to reduce the release of fiberglass or fiberglass pieces into the filtered fluid in connection with a transmission oil filter comprising a filtration layer of fiberglass medium.

SUMMARY OF THE INVENTION

In accordance with the present invention, this is achieved in that the filter is provided downstream of the filtration layer of fiberglass medium with a melt blown layer for preventing or reducing the introduction of fiberglass into the liquid to be filtered.

The melt blown layer downstream of the filtration layer made of fiberglass medium is able to at least greatly reduce the release of fiberglass and enables therefore the use of fiberglass media for filtration.

Often, in transmission oil filters on one or both faces of the filtration layer made from fiberglass medium a spunbond layer is applied for improved handling of the filtration layer of fiberglass medium.

Preferably, the filtration layer of fiberglass medium has a thickness of 0.3 mm to 1.0 mm for the use in a transmission oil filter, therefore having a median layer thickness of $(0.3+1)/2=6.5$ mm.

Preferably, the filtration layer of fiberglass medium has a fabric weight of 40 grams per square meter (GSM) to 110 grams per square meter (GSM) in case of a transmission oil filter, therefore having a median fabric weight of $(40+110)/2=75$ (GSM).

Preferably, the melt blown layer has a thickness of 0.2 mm to 0.7 mm, therefore a median layer thickness of $(0.2+0.7)/2=4.5$ mm.

Preferably, the melt blown layer has a fabric weight of 20 grams per square meter (GSM) to 60 grams per square meter (GSM), therefore a median fabric weight of $(20+60)/2=40$ (GSM).

Preferably, the spunbond nonwoven has a thickness of 0.05 mm to 0.2 mm.

Preferably, the spunbond nonwoven has a fabric weight of 10 GSM to 50 GSM.

The fiberglass medium is comprised preferably of at least 90 percent by weight of fiberglass.

The fiberglass medium comprises preferably glass fibers of a diameter of 1 micrometer to 8 micrometers and a fiber length between 100 micrometers and 1,000 micrometers, therefore having a median fiber diameter of $(1+8)/2=4.5$ micrometers.

The melt blown layer at the downstream side comprises preferably at least 90 percent by weight polyester fibers with a diameter of 1 micrometer to 30 micrometers, therefore a median fiber diameter of $(1+30)/2=15.5$ micrometers.

In a preferred embodiment, the melt blown layer is coated or laminated onto the filtration layer of fiberglass medium or onto the spunbond nonwoven layer on the fiberglass layer or is directly applied by the melt blowing process.

In a preferred embodiment, the layer sequence comprising the filtration layer of fiberglass medium, the downstream melt blown layer and possibly one or two spunbond layers is introduced in the filter in folded form.

Further advantageous configurations and modifications are disclosed in the dependent claims as well as in the embodiments described in the following.

DESCRIPTION OF THE PREFERRED EMBODIMENTS

Figure 1:
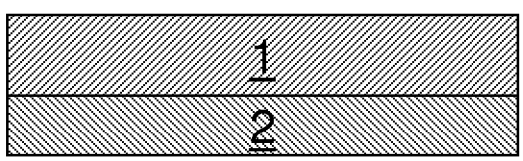
FIG. 1 shows a filtration layer of fiberglass medium with a melt blown layer applied to the downstream side of the filtration layer.
Figure 2:
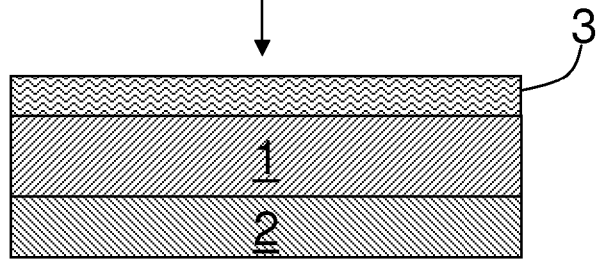
FIG. 2 shows a filtration layer of fiberglass medium with a spunbond nonwoven layer on one side and a melt blown layer applied to the downstream side of the filtration layer.
Figure 3:
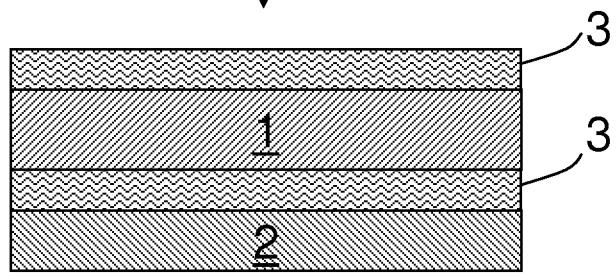
FIG. 3 shows a filtration layer of fiberglass medium with spunbond nonwoven layers applied to both faces and with a melt blown layer applied downstream of the filtration layer.

FIGS. 1 to 3 show different layer sequences comprising a fiberglass layer 1 as well as a melt blown layer 2 at the downstream side (the arrow indicates the flow direction of the fluid to be filtered). In addition on one or both faces of the fiberglass layer a nonwoven layer of spunbond nonwoven 3 can be applied. The spunbond nonwoven layer improves handing of the fiberglass layer during the manufacturing process and has a thickness of 0.05 mm to 0.2 mm and a fabric weight of 10 GSM to 50 GSM.

In the embodiments illustrated in the drawings, the filtration layer is comprised of fiberglass. The fiberglass (glass fibers) have a diameter of approximately 1 micrometer to 8 micrometers and a length of approximately 100 micrometers to 1,000 micrometers. Other diameters and lengths are possible as a function of the filtration purpose. The fiberglass layer has a thickness between 0.3 mm to 1.0 mm and a fabric weight of 40 GSM to 110 GSM. Thickness and fabric weight will be selected by a person of skill in the art based on the filtration task.

The preferred melt blown layer in this embodiment does not provide a filtration effect for the fluid to be purified but serves only for retaining the fiberglass or fiberglass pieces. In another embodiment, the melt blown layer can also be provided with filtration properties for the fluid to be purified.

Preferably, the melt blown layer has a thickness between 0.2 mm and 0.7 mm and a fabric weight of 20 GSM to 60 GSM and is made of polyester wherein the melt blown fibers have a diameter of substantially 1 micrometer to 30 micrometers, preferably 1 micrometer to 10 micrometers.

While specific embodiments of the invention have been shown and described in detail to illustrate the inventive principles, it will be understood that the invention may be embodied otherwise without departing from such principles.

What is claimed is:

1. A transmission oil filter comprising
a filtration layer of fiberglass medium having at least 90 percent by weight of fiberglass, wherein said filtration layer has a fiber diameter of 1 micrometer to 8 micrometers, a layer thickness of 0.3 mm to 1.0 mm, and a fabric weight of 40 to 110 GSM, and
downstream of said filtration layer, a melt blown layer is arranged directly onto a downstream face of said fiberglass filtration layer,
wherein said melt blown layer is not a filtration layer, said melt blown layer having at least 90 percent by weight polyester fibers of a diameter of 1 micrometer to 30 micrometers, a layer thickness of 0.2 mm to 0.7 mm, and a fabric weight of 20 GSM to 60 GSM,
wherein the melt blown layer has a lower median fabric weight, and a lower median layer thickness than the filtration fiberglass layer, whereby the meltblown layer does not have a filtration effect relative to the filtration fiberglass layer, said melt blown layer serves only for retaining fiberglass or fiberglass medium pieces from the filtration layer in the oil filter, preventing or reducing introduction of fiberglass into a liquid to be filtered.

2. The transmission oil filter according to claim 1, wherein said fiberglass filtration layer is a fiberglass layer without pulp fibers.

3. The transmission oil filter according to claim 2, wherein said filtration layer of fiberglass medium has two faces and
wherein a spunbond nonwoven layer is attached onto an upstream face of said fiberglass filtration layer for improved handling of said filtration layer.

4. The transmission oil filter according to claim 3, wherein said spunbond layer has a thickness of 0.05 mm to 0.2 mm and a fabric weight of 10 grams per square meter to 50 grams per square meter.

5. The transmission oil filter according to claim 2, wherein said fiberglass medium has a fiber diameter between 1 micrometer and 8 micrometers and a fiber length between 100 micrometer and 1,000 micrometers.

6. The transmission oil filter according to claim 2, wherein said melt blown layer is laminated onto said filtration layer of fiberglass medium.

7. The transmission oil filter according to claim 2, wherein said melt blown layer is directly applied by melt blowing onto said filtration layer of fiberglass medium.

8. The transmission oil filter according to claim 1, wherein the melt blown layer has a larger median fiber diameter than the median fiber diameter of the filtration fiberglass layer, whereby the meltblown layer does not have a filtration effect relative to the filtration fiberglass layer,
wherein said melt blown layer serves only for retaining fiberglass or fiberglass medium pieces from the filtration layer in the oil filter, for preventing or reducing introduction of fiberglass into the liquid to be filtered.

9. The transmission oil filter according to claim 8, wherein the median fiber diameter of the melt blown layer is at least twice the median fiber diameter of the filtration fiberglass layer, whereby the meltblown layer does not have a filtration effect relative to the filtration fiberglass layer,
wherein said melt blown layer serves only for retaining fiberglass or fiberglass medium pieces from the filtration layer in the oil filter, for preventing or reducing introduction of fiberglass into the liquid to be filtered.

10. The transmission oil filter according to claim 9, wherein
the median fiber diameter of the melt blown layer is approximately triple the median fiber diameter of the filtration fiberglass layer.

11. A transmission oil filter comprising
a filtration layer of fiberglass medium having at least 90 percent by weight of fiberglass, wherein said filtration layer has a fiber diameter of 1 micrometer to 8 micrometers, a layer thickness of 0.3 mm to 1.0 mm, and a fabric weight of 40 to 110 GSM, and
a spunbond nonwoven layer arranged at and attached onto an upstream face of the fiberglass filtration layer for improved handling of the filtration layer;
a second spunbond nonwoven layer arranged at and attached onto a downstream face of the fiberglass filtration layer for improved handling of the filtration layer;
a melt blown layer is arranged at and attached onto a downstream face of the second spunbond nonwoven layer;
wherein said melt blown layer is not a filtration layer, said melt blown layer having at least 90 percent by weight polyester fibers of a diameter of 1 micrometer to 30 micrometers, a layer thickness of 0.2 mm to 0.7 mm, and a fabric weight of 20 GSM to 60 GSM,
wherein the melt blown layer has a lower median fabric weight, and a lower median layer thickness than the filtration fiberglass layer, whereby the meltblown layer does not have a filtration effect relative to the filtration fiberglass layer, said melt blown layer serves only for retaining fiberglass or fiberglass medium pieces from the filtration layer in the oil filter, preventing or reducing introduction of fiberglass into a liquid to be filtered.

12. The transmission oil filter according to claim 11, wherein
said melt blown layer is laminated onto said second spunbond layer.

13. The transmission oil filter according to claim 11, wherein
said melt blown layer is directly applied by melt blowing onto said second spunbond layer.

14. The transmission oil filter according to claim 11, wherein
said spunbond nonwoven layers each have a thickness of 0.05 mm to 0.2 mm and a fabric weight of 10 grams per square meter to 50 grams per square meter.

15. The transmission oil filter according to claim 11, wherein
the melt blown layer has a larger median fiber diameter than the median fiber diameter of the filtration fiberglass layer, whereby the meltblown layer does not have a filtration effect relative to the filtration fiberglass layer,
wherein said melt blown layer serves only for retaining fiberglass or fiberglass medium pieces from the filtration layer in the oil filter, for preventing or reducing introduction of fiberglass into the liquid to be filtered.

16. The transmission oil filter according to claim 15, wherein the median fiber diameter of the melt blown layer is at least twice the median fiber diameter of the filtration fiberglass layer, whereby the meltblown layer does not have a filtration effect relative to the filtration fiberglass layer, wherein said melt blown layer serves only for retaining fiberglass or fiberglass medium pieces from the filtration layer in the oil filter, for preventing or reducing introduction of fiberglass into the liquid to be filtered.

17. The transmission oil filter according to claim 16, wherein the median fiber diameter of the melt blown layer is approximately triple the median fiber diameter of the filtration fiberglass layer.

* * * * *